US008761299B2

(12) United States Patent
Nishikawa

(10) Patent No.: US 8,761,299 B2
(45) Date of Patent: Jun. 24, 2014

(54) PREAMBLE GENERATING APPARATUS, PREAMBLE GENERATING METHOD, AND COMPUTER READABLE RECORDING MEDIUM STORING PROGRAM

(75) Inventor: Nobuyoshi Nishikawa, Osaka (JP)

(73) Assignee: Icom Incorporated (JP)

( * ) Notice: Subject to any disclaimer, the term of this patent is extended or adjusted under 35 U.S.C. 154(b) by 182 days.

(21) Appl. No.: 13/191,909

(22) Filed: Jul. 27, 2011

(65) Prior Publication Data

US 2012/0147997 A1    Jun. 14, 2012

(30) Foreign Application Priority Data

Dec. 10, 2010   (JP) ................................ 2010-275631

(51) Int. Cl.
*H04L 27/00*        (2006.01)
(52) U.S. Cl.
USPC ........... 375/295; 375/131; 375/140; 375/142; 375/146; 375/148; 370/203; 370/208
(58) Field of Classification Search
CPC ... H04J 13/0062; H04J 13/14; H04J 13/0055; H04J 11/0069; H04L 27/2613
USPC .......... 375/131, 140, 142, 146, 148; 370/203, 370/208
See application file for complete search history.

(56) References Cited

U.S. PATENT DOCUMENTS

| 7,746,916 | B2 * | 6/2010 | Han et al. ...................... 375/142 |
| 2004/0208253 | A1 * | 10/2004 | Joo ................................ 375/260 |
| 2005/0013381 | A1 * | 1/2005 | Suh et al. ...................... 375/260 |
| 2006/0078040 | A1 * | 4/2006 | Sung et al. .................... 375/140 |
| 2006/0098749 | A1 * | 5/2006 | Sung et al. .................... 375/260 |
| 2010/0034155 | A1 * | 2/2010 | Noh et al. ..................... 370/329 |

FOREIGN PATENT DOCUMENTS

| JP | 2009-516416 | 4/2009 |
| JP | 2010-516143 | 5/2010 |
| JP | 2010-246107 | 10/2010 |
| JP | 2012-503407 | 2/2012 |
| WO | 2006015108 A2 | 2/2006 |
| WO | 2008-038367 | 4/2008 |

OTHER PUBLICATIONS

English Translation of the Notification of Reasons for Rejection from the Japan Patent Office mailed Feb. 12, 2014 in Japanese Patent Application No. 2010-275631.

* cited by examiner

*Primary Examiner* — Aristocratis Fotakis
*Assistant Examiner* — Fabricio R Murillo Garcia
(74) *Attorney, Agent, or Firm* — Baker & McKenzie LLP

(57) ABSTRACT

A preamble generating apparatus used for synchronization of a reception apparatus in an orthogonal frequency division multiplexing system and generating a preamble to be added to a beginning of data at a time of communication, receives preamble length identifying information and position specifying information, and generates a plurality of elements constituting a preamble according to a predetermined sequence based on those information. The preamble generating apparatus creates a preamble model, and generates a plurality of preambles by setting the generated elements at positions of elements in element deciding information included in the preamble model, the positions indicating elements in the preamble model which are to be used in data communication. The preamble generating apparatus calculates PAPRs respectively corresponding to the plurality of preambles, and compares the PAPRs of the preambles with one another to decide the preamble corresponding to a minimum PAPR as a preamble to be used in communication.

10 Claims, 21 Drawing Sheets

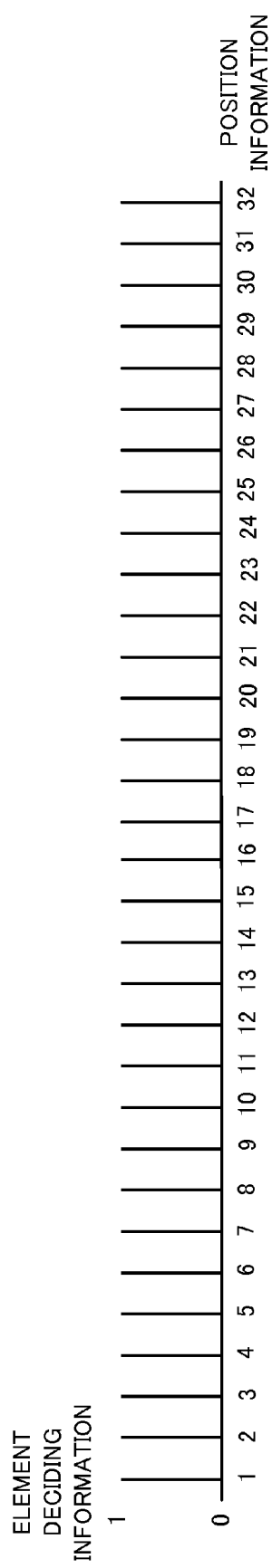

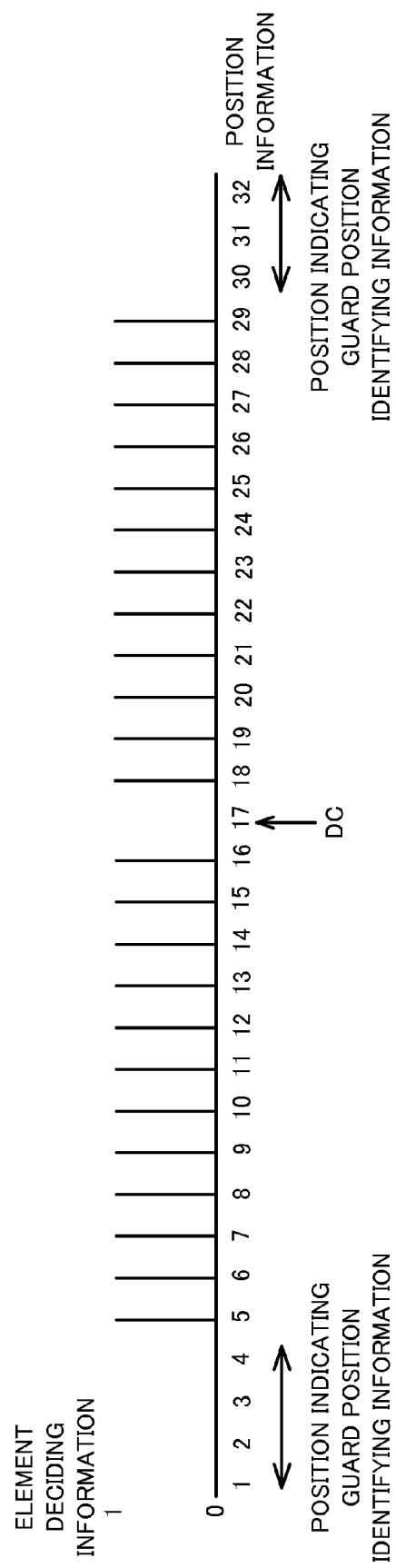

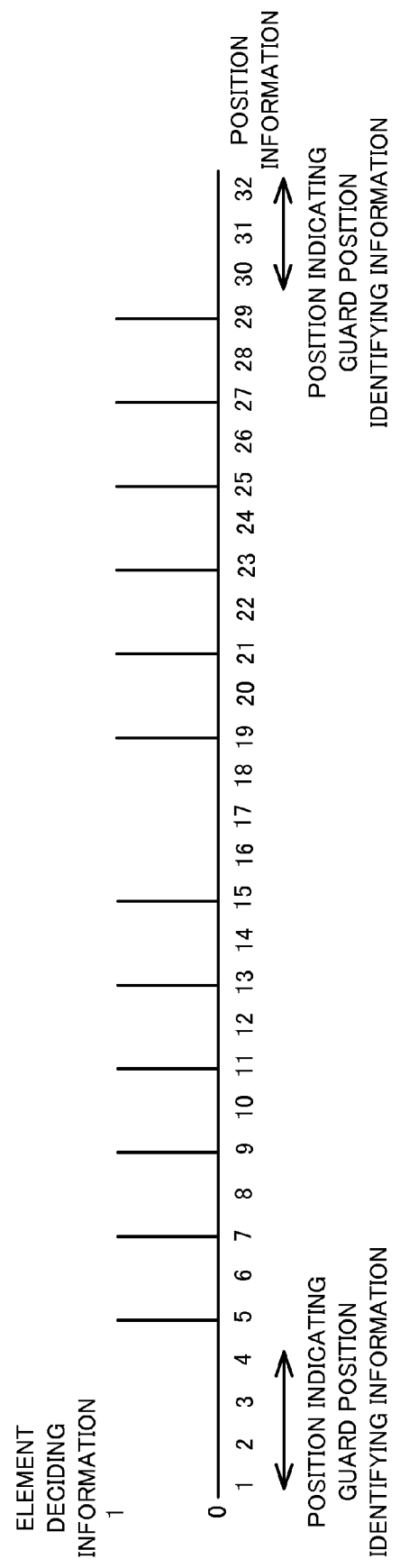

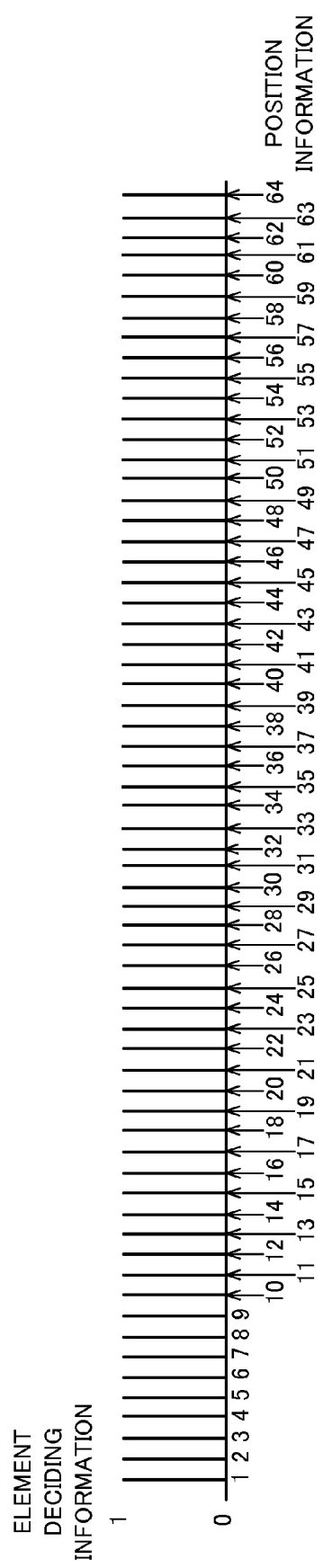

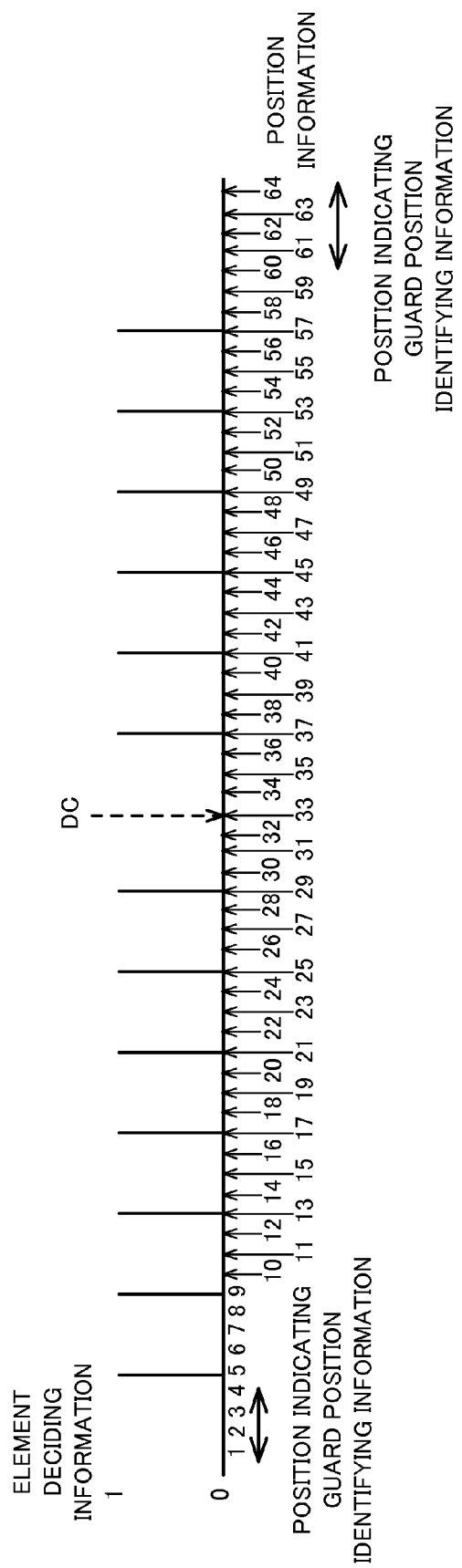

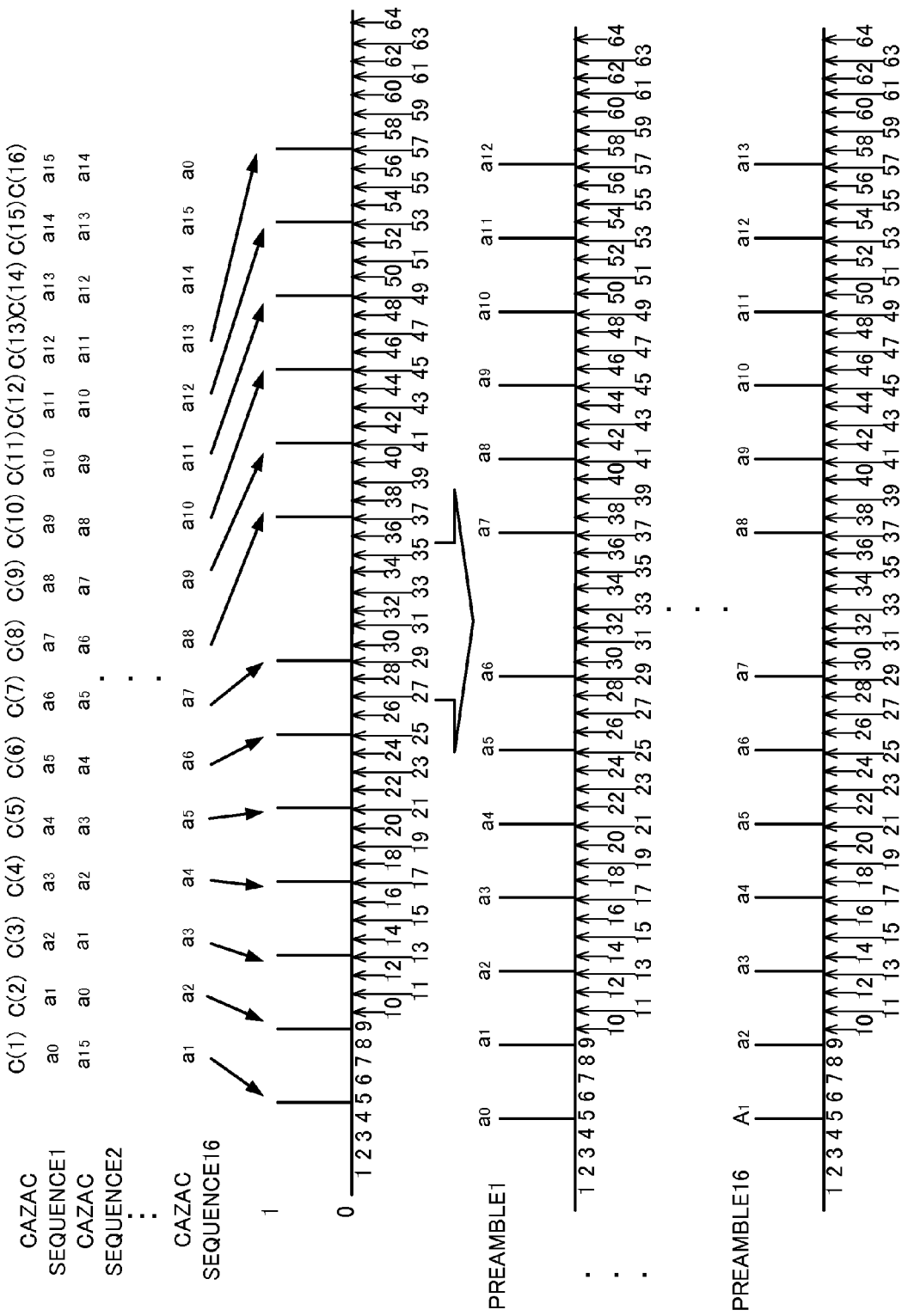

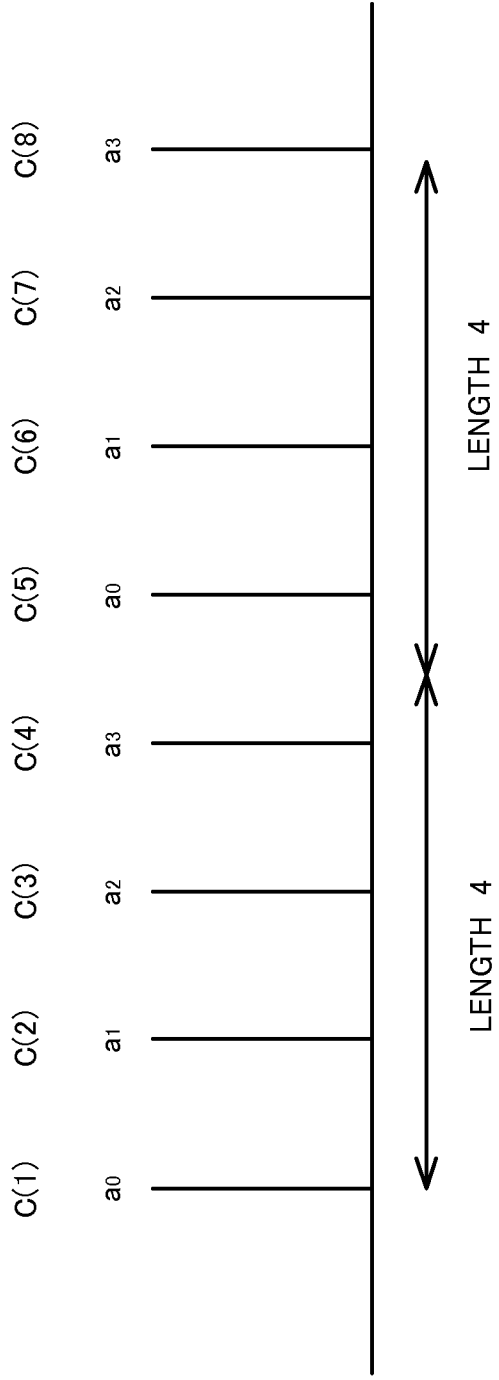

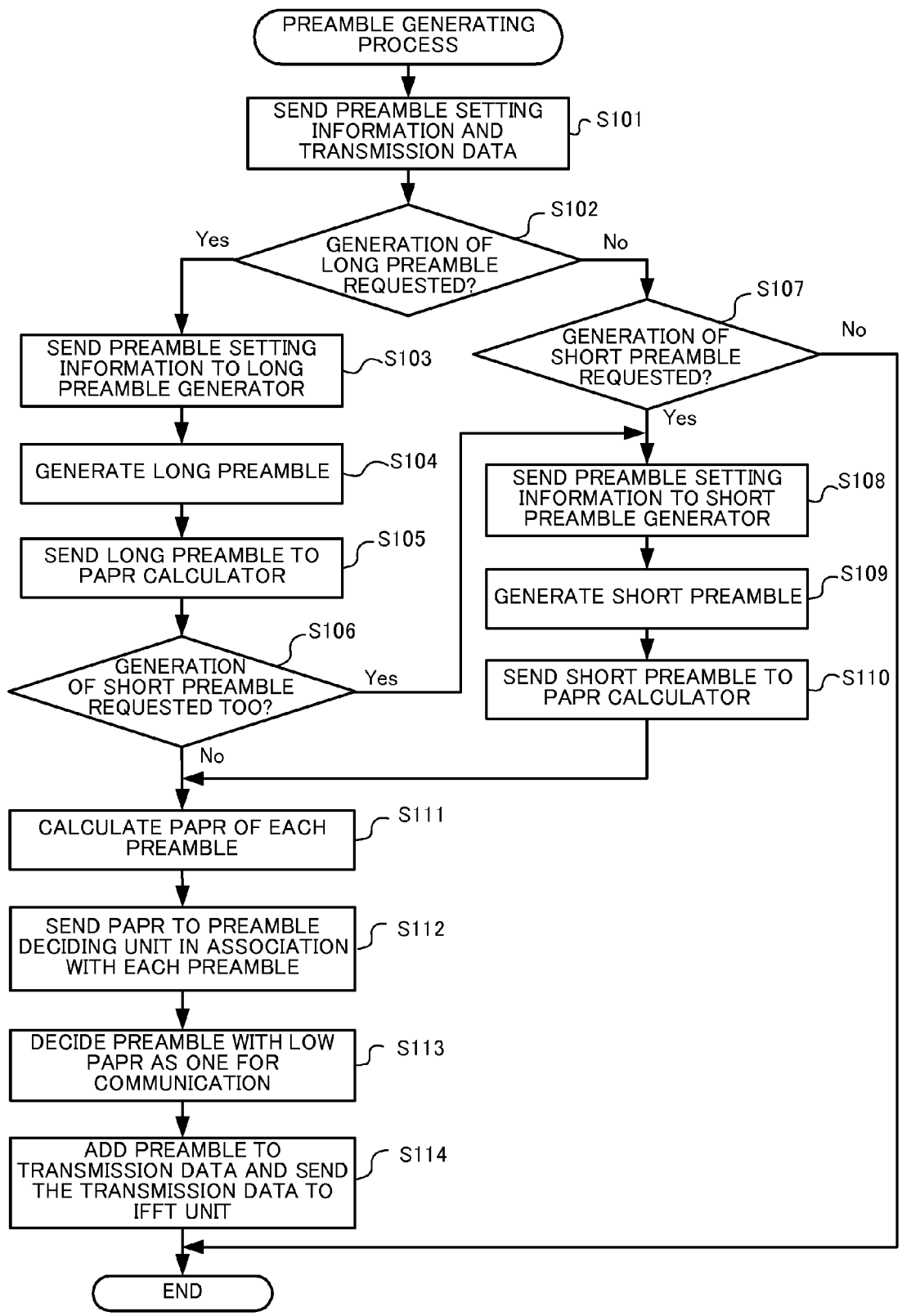

ical Publication No. (WO) 2006/015108 is a preamble having a length of power of two. In general, a plurality of guard subcarriers used to avoid spectral interference of two frequency bands need to be provided in a preamble in carrying out communication, and the number of guard subcarriers varies among communication systems. To cope with various communication systems, therefore, a preamble with an arbitrary length is required. Further, the greater the recursion of a CAZAC sequence gets like two, four and so forth, the higher the PAPR becomes. Therefore, it is not still sufficient from the viewpoint of generating a preamble with a low PAPR and an arbitrary length.

Accordingly, it is an object of the present invention to provide a preamble generating apparatus and a preamble generating method which can generate a preamble with a low PAPR and an arbitrary length, and a computer readable recording medium storing a program capable of generating such a preamble.

To achieve the object, according to a first aspect of the invention, there is provided a preamble generating apparatus used for synchronization of a reception apparatus in an orthogonal frequency division multiplexing system and generating a preamble to be added to a beginning of data at a time of communication, including:

a reception unit that receives preamble setting information including preamble length identifying information indicating a length of the preamble requested to be generated, guard position identifying information indicating a position of an element constituting a guard interval in the preamble, and DC position identifying information indicating an element in approximately a center of the preamble;

a preamble-elements generating unit that generates a plurality of elements constituting the preamble according to a predetermined sequence based on the preamble length identifying information received by the reception unit;

a preamble-model creating unit that creates a preamble model including position information indicating a position of an element constituting the preamble and element deciding information indicating whether the element corresponding to the position is to be used in data communication, based on the preamble length identifying information, the guard position identifying information and the DC position identifying information received by the reception unit;

a preamble generating unit that generates a plurality of preambles by setting the elements generated by the preamble-elements generating unit at positions of the elements to be used in data communication in the preamble model created by the preamble-model creating unit;

a PAPR calculator that calculates PAPRs respectively corresponding to the plurality of preambles generated by the preamble generating unit; and a preamble deciding unit that compares the PAPRs of the preambles calculated by the PAPR calculator with one another to decide that the preamble corresponding to a minimum PAPR is used in communication.

The preamble setting information may further include preamble identifying information identifying a type of the preamble requested to be generated, the preamble-elements generating unit may generate the plurality of elements constituting the preamble according to a predetermined sequence based on the preamble length identifying information and preamble identifying information received by the reception unit, and the preamble-model creating unit may create a preamble model including position information indicating a position of an element constituting the preamble and element deciding information indicating whether the element corresponding to the position is to be used in data communication, based on the preamble length identifying information, the guard position identifying information, the DC position identifying information and the preamble identifying information received by the reception unit.

The reception unit may further receive communication data input by a user's input operation, and the preamble generating apparatus may further include a transmission unit that adds a preamble decided by the preamble deciding unit to a beginning of the communication data received by the reception unit, and transmits the communication data to an IFFT (Inverse Fast Fourier Transform) unit which transforms a received signal to a time domain signal.

The preamble generating apparatus may further include a preamble storage unit that stores a preamble decided by the preamble deciding unit into a storage device of a communication equipment.

The predetermined sequence may be a Frank-Zadoff sequence.

To achieve the object, according to a second aspect of the invention, there is provided a preamble generating method used for synchronization of a reception apparatus in an orthogonal frequency division multiplexing system and generating a preamble to be added to a beginning of data at a time of communication, the method including:

a reception step of receiving preamble setting information including preamble length identifying information indicating a length of the preamble requested to be generated, guard position identifying information indicating a position of an element constituting a guard interval in the preamble, and DC position identifying information indicating an element in approximately a center of the preamble;

a preamble-elements generating step of generating a plurality of elements constituting the preamble according to a predetermined sequence based on the preamble length identifying information received at the reception step;

a preamble-model creating step of creating a preamble model including position information indicating a position of an element constituting the preamble and element deciding information indicating whether the element corresponding to the position is to be used in data communication, based on the preamble length identifying information, the guard position identifying information and the DC position identifying information received at the reception step;

a preamble generating step of generating a plurality of preambles by setting the elements generated at the preamble-elements generating step at positions of the elements to be used in data communication in the preamble model created at the preamble-model creating step;

a PAPR calculating step of calculating PAPRs respectively corresponding to the plurality of preambles generated at the preamble generating step; and a preamble deciding step of comparing the PAPRs of the preambles calculated at the PAPR calculating step with one another to decide that the preamble corresponding to a minimum PAPR is used in communication.

To achieve the object, according to a third aspect of the invention, there is provided a computer readable recording medium storing a program allowing a computer used for synchronization of a reception apparatus in an orthogonal frequency division multiplexing system and generating a preamble to be added to a beginning of data at a time of communication, to function as:

a reception unit that receives preamble setting information including preamble length identifying information indicating a length of the preamble requested to be generated, guard position identifying information indicating a position of an element constituting a guard interval in the preamble, and DC position identifying information indicating an element in approximately a center of the preamble;

a preamble-elements generating unit that generates a plurality of elements constituting the preamble according to a predetermined sequence based on the preamble length identifying information received by the reception unit;

a preamble-model creating unit that creates a preamble model including position information indicating a position of an element constituting the preamble and element deciding information indicating whether the element corresponding to the position is to be used in data communication, based on the preamble length identifying information, the guard position identifying information and the DC position identifying information received by the reception unit;

a preamble generating unit that generates a plurality of preambles by setting the elements generated by the preamble-elements generating unit at positions of the elements to be used in data communication in the preamble model created by the preamble-model creating unit;

a PAPR calculator that calculates PAPRs respectively corresponding to the plurality of preambles generated by the preamble generating unit; and a preamble deciding unit that compares the PAPRs of the preambles calculated by the PAPR calculator with one another to decide that the preamble corresponding to a minimum PAPR is used in communication.

BRIEF DESCRIPTION OF THE DRAWINGS

A more complete understanding of this application can be obtained when the following detailed description is considered in conjunction with the following drawings, in which:

FIG. 8A is a diagram showing one example of a preamble model for a long preamble to be generated by the preamble generating apparatus according to the embodiment of the invention;

FIG. 8B is a diagram showing another example of a preamble model for a long preamble to be generated by the preamble generating apparatus according to the embodiment of the invention;

FIG. 8C is a diagram showing a different example of a preamble model for a long preamble to be generated by the preamble generating apparatus according to the embodiment of the invention;

FIG. 13A is a diagram showing one example of a preamble model for a short preamble to be generated by the preamble generating apparatus according to the embodiment of the invention;

FIG. 13C is a diagram showing a different example of a preamble model for a short preamble to be generated by the preamble generating apparatus according to the embodiment of the invention;

FIG. 14 is a diagram showing one example of a plurality of short preambles to be generated by the preamble generating apparatus according to the embodiment of the invention;

FIG. 15 is a diagram showing one example of a CAZAC sequence for a short preamble to be generated by the preamble generating apparatus according to the embodiment of the invention;

FIG. 16 is a flowchart illustrating procedures of a preamble generating process in the preamble generating apparatus according to the embodiment of the invention.

DETAILED DESCRIPTION

The following will describe an example where a preamble generating apparatus according to an embodiment of the present invention is adapted to a communication apparatus, and give a detailed description of the configuration of the preamble generating apparatus.

Figure 1:
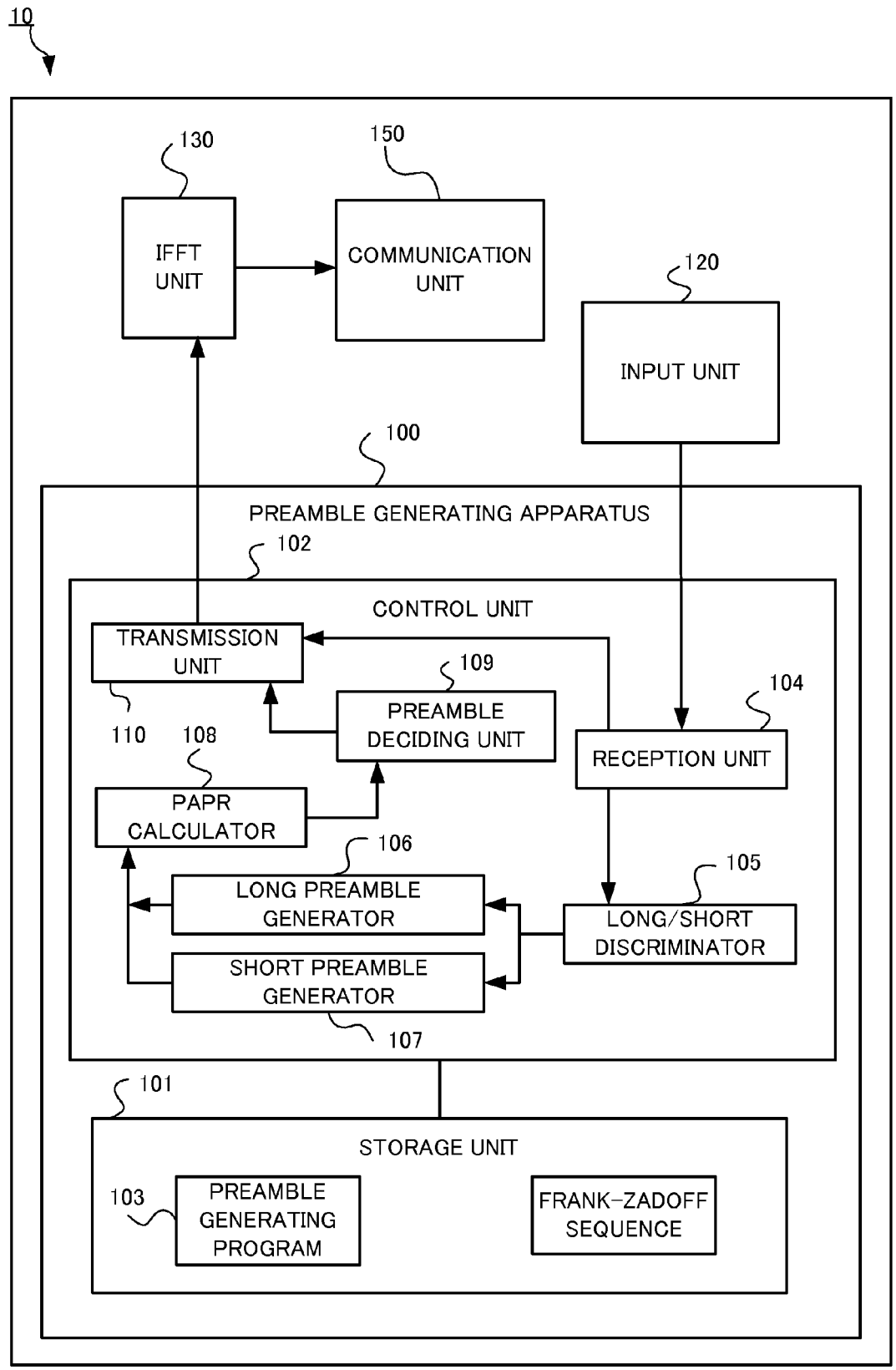
FIG. 1 is a block diagram showing the configuration of a communication apparatus including a preamble generating apparatus according to an embodiment of the present invention.

A communication apparatus 10 includes a preamble generating apparatus 100, an input unit 120, an IFFT (Inverse Fast Fourier Transform) unit 130, and a communication unit 150 as shown in FIG. 1.

For ease of understanding, data transmission by the communication apparatus 10 will be described first. The communication apparatus 10 carries out data transmission by adding a preamble generated by the preamble generating apparatus 100 to transmission data input from the input unit 120, and transmitting the resultant transmission data as a radio signal.

Specifically, a preamble is generated in a frequency domain, and is then transformed to a time domain signal by the IFFT unit 130. Then, the transformed signal is transmitted as a radio signal by the communication unit 150. On the reception side, the time domain signal is transformed to a frequency domain signal by FFT (Fast Fourier Transform) to acquire original information.

Figure 2:
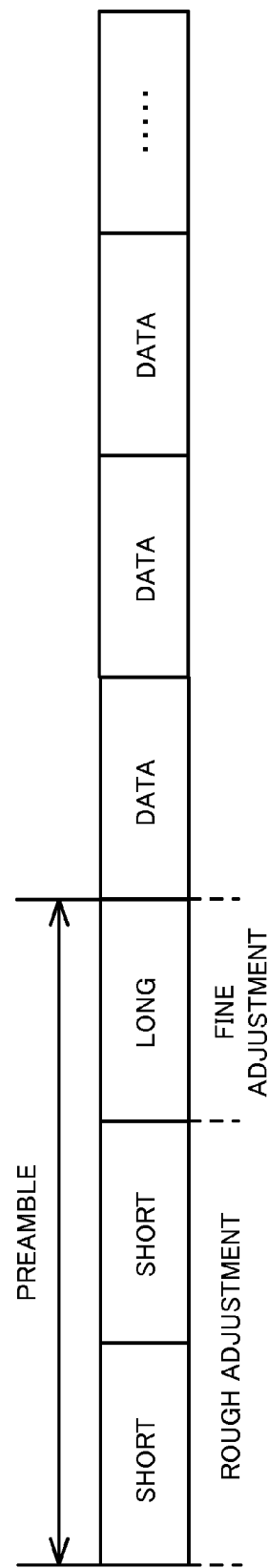
FIG. 2 is a diagram showing the structure of communication data to be transmitted by the communication apparatus shown in FIG. 1.

A detailed description of a preamble is given below. A preamble is added to the beginning of transmission data as shown in FIG. 2 and used for detection, correction, synchronization, etc. of signals. As shown in FIG. 2, the preamble is formed by a combination of a short preamble and a long preamble.

For example, a PLCP (Physical Layer Convergence Protocol) preamble in IEEE802.11a is comprised of a short preamble including ten short training symbols and a long preamble including two long training symbols.

The short preamble is used for rough adjustment for signal detection, and the long preamble is used for fine adjustment for signal detection. A combination of those preambles is freely determined according to the individual specifications or usages.

Figure 3:
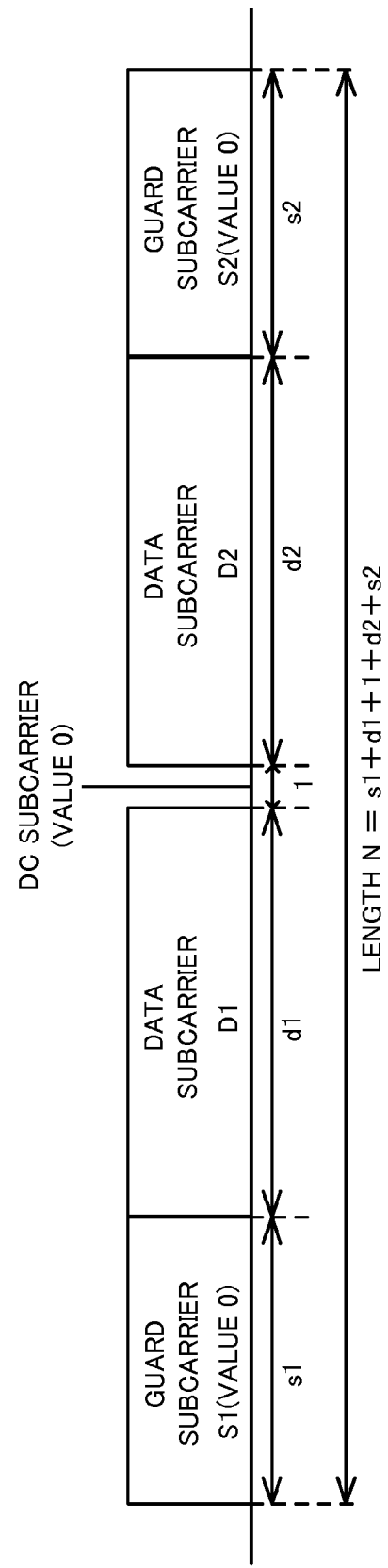
FIG. 3 is a diagram for explaining the structure of a preamble to be generated by the preamble generating apparatus according to the embodiment of the invention.

Each preamble includes guard subcarriers, a DC subcarrier and data subcarriers as shown in FIG. 3.

The guard subcarriers are a set of subcarriers with a value of 0, which are located at both ends of a preamble as illustrated, and are used to avoid spectral interference between two frequency bands, not in data transmission.

The DC subcarrier is a subcarrier with a value of 0, which is located in the center of the preamble as illustrated, and is not used in data transmission.

The data subcarriers are a set of subcarriers which are located between the guard subcarriers at both ends of the preamble, and are used in data transmission.

The preamble generating apparatus 100 according to the embodiment generates a preamble using a Frank-Zadoff sequence having a CAZAC property.

Figure 4:
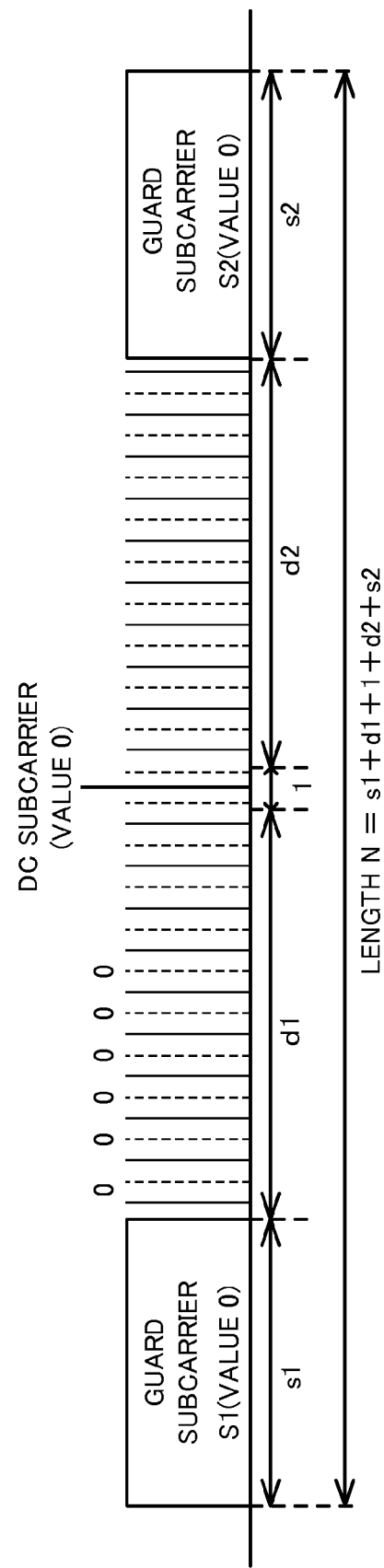
FIG. 4 is a diagram showing the structure of a long preamble to be generated by the preamble generating apparatus according to the embodiment of the invention.

The long preamble generated by the preamble generating apparatus 100 has one 0 inserted between subcarriers used in data transmission as shown in FIG. 4.

Figure 5:
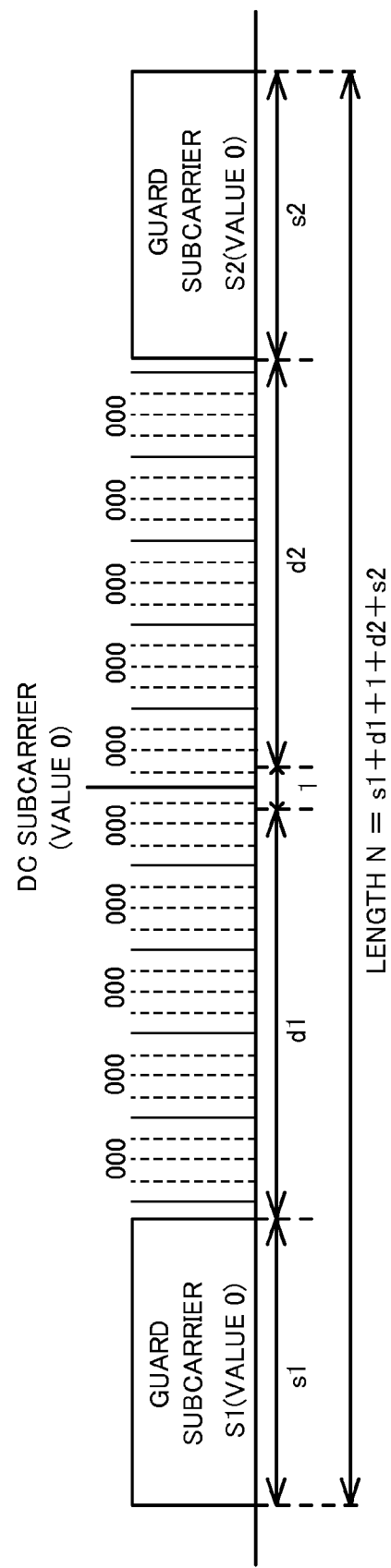
FIG. 5 is a diagram showing the structure of a short preamble to be generated by the preamble generating apparatus according to the embodiment of the invention.

The short preamble generated by the preamble generating apparatus 100 has three consecutive 0's inserted between subcarriers used in data transmission as shown in FIG. 5.

"0" inserted between subcarriers means that the subcarrier at that position cannot be communicated in the preamble.

Hereinafter, subcarriers respectively forming the guard subcarrier, DC subcarrier and data subcarrier are called "elements" constituting a preamble.

As shown in FIG. 1, the preamble generating apparatus 100 includes a storage unit 101 and a control unit 102.

The storage unit 101 includes a flash memory, hard disk, DVD-RAM (Digital Versatile Disc Random-Access Memory), DVD-RW (Digital Versatile Disc ReWritable) or the like, and holds a preamble generating program 103. A Frank-Zadoff sequence having a CAZAC property given by the following equation 1 is stored in advance in the storage unit 101.

$$ak = \exp[j\theta(k)], (0 \leq k < L) \quad (1)$$

$(L^{1/2}$ is an integer, $k=p+q(L^{1/2})$, $\theta(k)=2\pi pq/(L^{1/2})$, $p=0, 1, \ldots, L^{1/2}-1$, $q=0, 1, \ldots, L^{1/2}-1$)

A series of operations for generating a predetermined preamble are described in the preamble generating program 103.

The control unit 102 includes a CPU (Central Processing Unit) or the like. The control unit 102 operates according to the preamble generating program 103 to provide the preamble generating capability. The control unit 102 includes a reception unit 104, a long/short discriminator 105, a long preamble generator 106, a short preamble generator 107, a PAPR calculator 108, a preamble deciding unit 109, and a transmission unit 110 as the essential functional sections.

The reception unit 104 receives preamble setting information indicating the settings of a preamble input by a user from the input unit 120 to be described later, and sends the preamble setting information to the long/short discriminator 105. The preamble setting information includes preamble identifying information identifying the type of a preamble requested to be generated, preamble length identifying information indicating the length of the preamble, guard position identifying information indicating the positions of the guard subcarriers in the preamble, and DC position identifying information indicating the position of the DC subcarrier in the preamble.

The reception unit 104 also receives transmission data used in data communication from the input unit 120 to be described later, and sends the transmission data to the transmission unit 110 to be described later.

The long/short discriminator 105 discriminates based on the preamble identifying information received from the reception unit 104 whether which one of a long preamble and a short preamble is requested to be generated, or both preambles are requested to be generated.

When it is discriminated that generation of the long preamble is requested, the long/short discriminator 105 sends the preamble setting information received from the reception unit 104 to the long preamble generator 106.

When it is discriminated that generation of the short preamble is requested, on the other hand, the long/short discriminator 105 sends the preamble setting information received from the reception unit 104 to the short preamble generator 107.

When it is discriminated that generation of both preambles is requested, the long/short discriminator 105 sends the preamble setting information received from the reception unit 104 to the long preamble generator 106 and the short preamble generator 107.

The long preamble generator 106 generates a long preamble as shown in FIG. 4 based on the Frank-Zadoff sequence stored in the storage unit 101 and the preamble setting information received from the long/short discriminator 105.

Specifically, the long preamble generator 106 determines whether the preamble length indicated by the preamble length identifying information included in the preamble setting information is power of two. When the preamble length is power of two, the long preamble generator 106 determines whether the square mot of the preamble length, indicated by the preamble length identifying information, divided by 2 is an integer.

The value of the preamble length divided by 2 is equivalent to the value L in the equation 1.

When the preamble length is power of two and the square mot of the preamble length divided by 2 is an integer ($L^{1/2}$ is an integer), the long preamble generator 106 creates a CAZAC sequence having a length equal to the preamble length (length of the value L), indicated by the preamble length identifying information, divided by 2 based on the Frank-Zadoff sequence stored in the storage unit 101.

For example, a case where the preamble length indicated by the received preamble length identifying information is 32 will be described. Since the preamble length is 32, the long preamble generator 106 determines that the preamble length is power of two.

Figure 6:
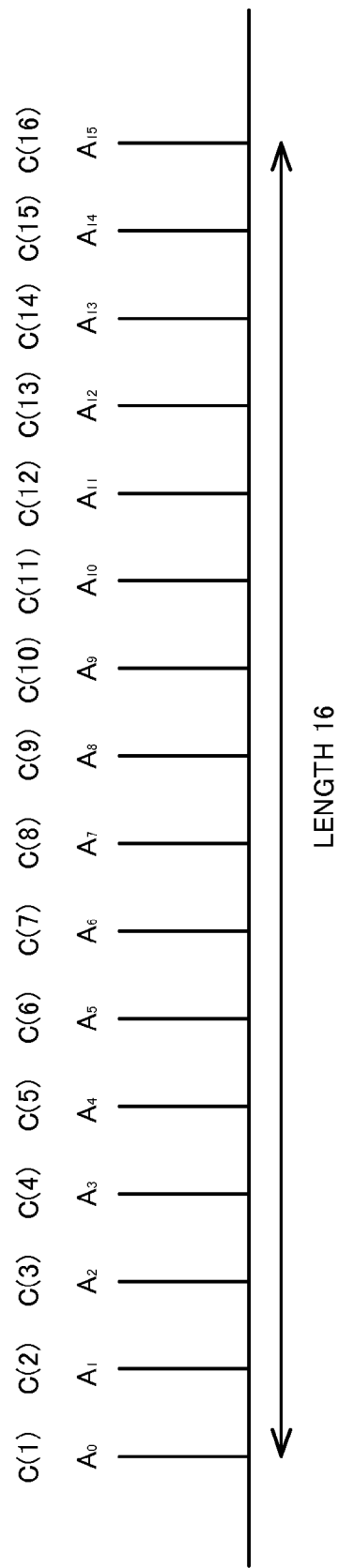
FIG. 6 is a diagram showing one example of a CAZAC sequence for a long preamble to be generated by the preamble generating apparatus according to the embodiment of the invention.

Since the preamble length divided by 2 is 16 whose square mot is an integer, the long preamble generator 106 substitutes k=0 to 15 in the equation 1 stored in the storage unit 101 to create a CAZAC sequence C(1) to C(16) with a length of 16 (a0, a1, a2, a3, a4, a5, a6, a7, a8, a9, a10, a11, a12, a13, a14, a15) as shown in FIG. 6.

Figure 7:
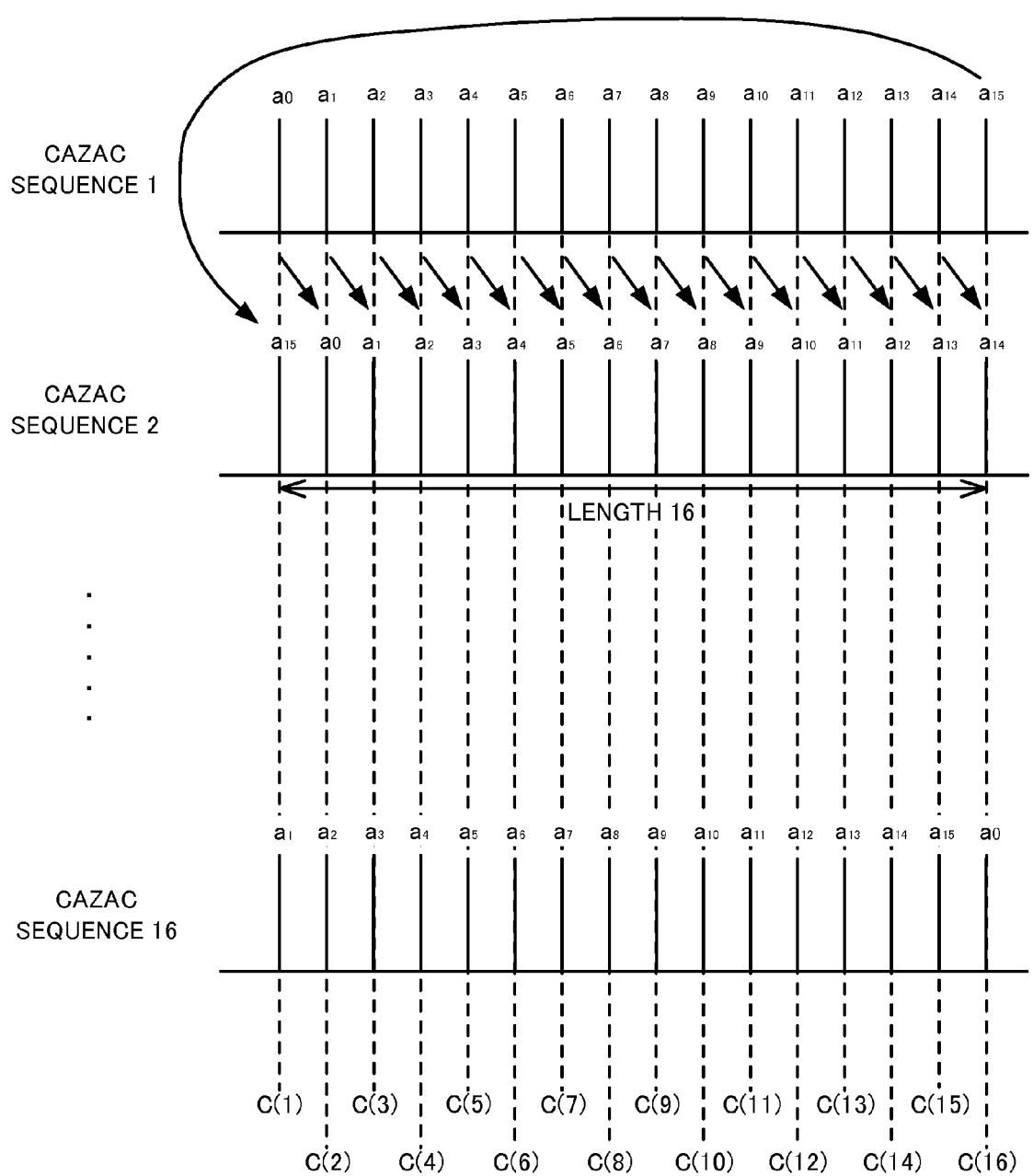
FIG. 7 is a diagram showing one example of a plurality of CAZAC sequences for a long preamble to be generated by the preamble generating apparatus according to the embodiment of the invention.

In addition, the long preamble generator 106 creates sixteen kinds of CAZAC sequences 1 to 16 by cyclically shifting the individual elements in the created CAZAC sequence with a length of 16 as shown in FIG. 7. Then, the long preamble generator 106 stores the created CAZAC sequences into the storage unit 101.

Subsequently, the long preamble generator 106 creates a preamble model based on the preamble setting information received from the long/short discriminator 105. The preamble model determines which one of the elements in the created CAZAC sequence is used in data communication of the preamble.

The preamble model includes position information indicating the position of an element constituting the preamble, and element deciding information indicating whether the element at the position indicated by the position information is used in data communication of the preamble.

The long preamble generator 106 stores the created preamble model into the storage unit 101.

The creation of a preamble model in the long preamble generator 106 will be described below. For ease of understanding, the description of the preamble model is given of the case where the element deciding information at the position used in data communication of the preamble is 1 and the element deciding information at the position not used in the data communication is 0.

First, the long preamble generator 106 creates a preamble model with a length indicated by the received preamble length identifying information. In this example, the element deciding information at the position corresponding to every position information is 1.

Then, the long preamble generator 106 sets the element deciding information corresponding to the positions indicated by the guard position identifying information and DC position identifying information received from the long/short discriminator 105 to 0. The long preamble generator 106 sets the element deciding information on one of an element whose position indicated by the position information is even and an element whose position indicated by the position information is odd in the remaining element deciding information of 1 to 0. According to the embodiment of the invention, the element deciding information of an element at an even position is set to 0.

A description will be given of the case where the preamble length indicated by the preamble length identifying information is 32 as in the foregoing example. The long preamble generator 106 creates a preamble model with a length of 32 as shown in FIG. 8A.

When the positions indicated by the guard position identifying information received from the long/short discriminator 105 are 1-4 and 30-32, and the position indicated by the DC position identifying information is 17, the long preamble generator 106 sets the element deciding information corresponding to those positions to 0 as shown in FIG. 8B.

Subsequently, the long preamble generator 106 sets the element deciding information on each element whose position indicated by the position information is even in the individual elements in the preamble model whose remaining element deciding information is 1 to 0 as shown in FIG. 8C.

The long preamble generator 106 creates a preamble model this way. The created preamble model is stored in the storage unit 101.

The long preamble generator 106 sequentially reads a plurality of CAZAC sequences created from the storage unit 101, and generates a long preamble for each CAZAC sequence by setting the elements in the read CAZAC sequence in order from C(1) to the elements in the created preamble model whose element deciding information is 1 in the order of the smaller-to-larger values of their position information.

As in the foregoing description, a case where the preamble length indicated by the received preamble length identifying information is 32 will be described. The created preamble model is the preamble model shown in FIG. 8C, and the individual CAZAC sequences created are the CAZAC sequences 1 to 16 shown in FIG. 7.

Figure 9:
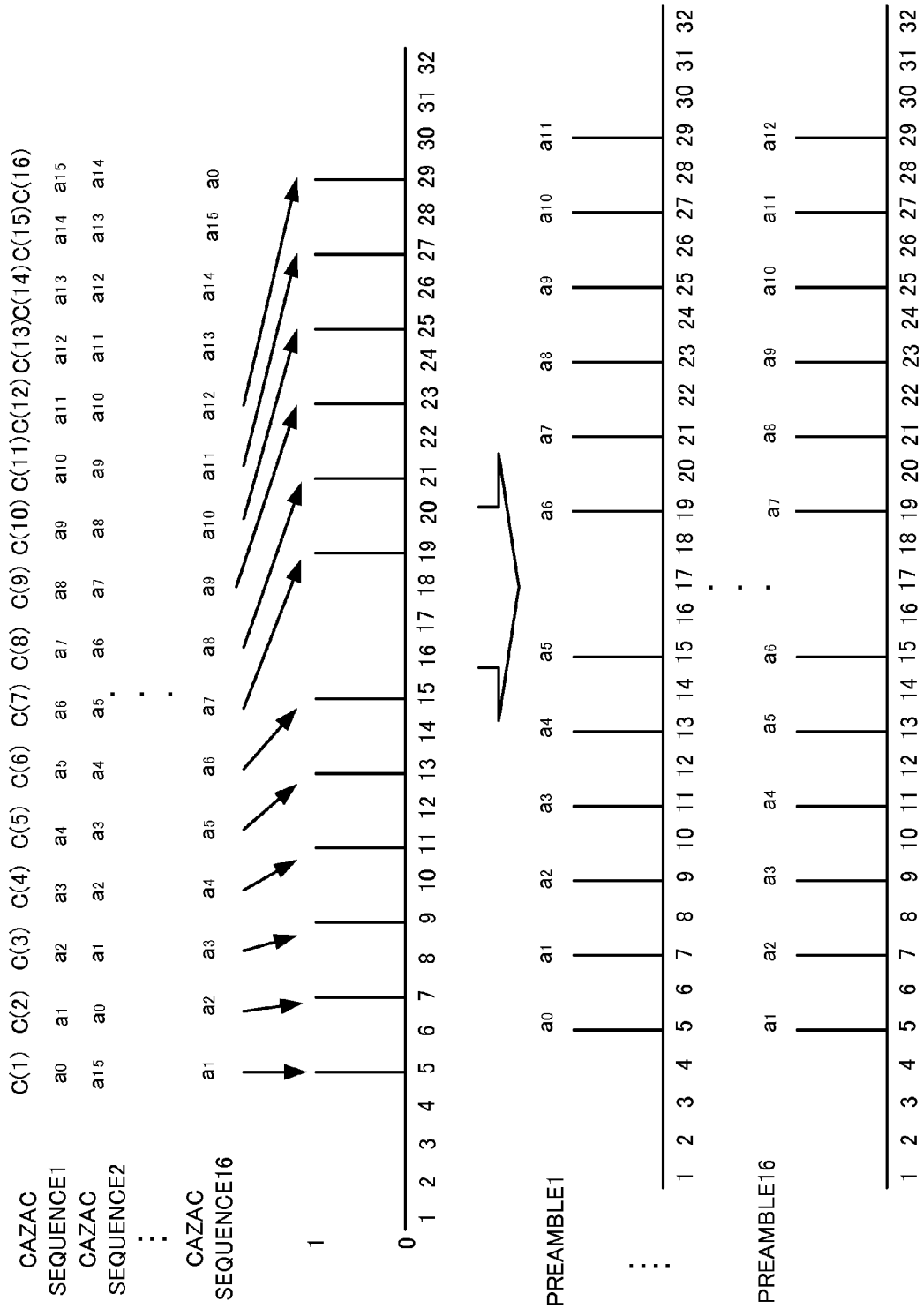
FIG. 9 is a diagram showing one example of a plurality of long preambles to be generated by the preamble generating apparatus according to the embodiment of the invention.

As shown in FIG. 9, the long preamble generator 106 generates preambles corresponding to the CAZAC sequences 1 to 16 by setting the elements in the CAZAC sequences 1 to 16 in FIG. 7 in order from C(1) to the elements in the preamble model shown in FIG. 8C whose element deciding information is 1 in the order of the smaller-to-larger values of their position information.

The long preamble generator 106 sends the generated preambles to the PAPR calculator 108.

When the preamble length is power of two and the square mot of the preamble length divided by 2 is not an integer ($L^{1/2}$ is not an integer), the long preamble generator 106 creates two CAZAC sequences each having a length equal to half a value obtained by dividing the preamble length (length of the value L/2), indicated by the preamble length identifying information, by 2 based on the Frank-Zadoff sequence stored in the storage unit 101.

For example, a case where the preamble length indicated by the received preamble length identifying information is 64 will be described. Since the preamble length is 64, the long preamble generator 106 determines that the preamble length is power of two.

Figure 10:
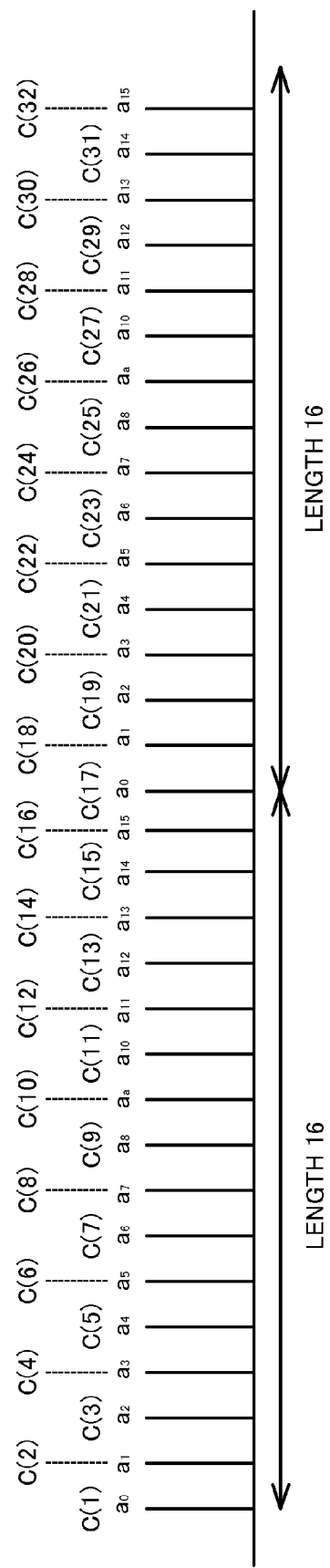
FIG. 10 is a diagram showing one example of a CAZAC sequence for a long preamble to be generated by the preamble generating apparatus according to the embodiment of the invention.

Since the preamble length divided by 2 is 32 whose square mot is not an integer, the long preamble generator 106 substitutes k=0 to 15 in the equation 1 stored in the storage unit 101 to create two CAZAC sequences C(1) to C(16) with a length of 16 (a0, a1, a2, a3, a4, a5, a6, a7, a8, a9, a10, a11, a12, a13, a14, a15), and combines those CAZAC sequences as shown in FIG. 10. Therefore, the CAZAC sequence to be created becomes a CAZAC sequence C(1) to C(32) with a length of 32.

In addition, the long preamble generator 106 creates sixteen kinds of CAZAC sequences by cyclically shifting the individual elements in the created CAZAC sequence as in the foregoing case where the preamble length is power of two and the square mot of the preamble length divided by 2 is an integer. Then, the long preamble generator 106 stores the individual created CAZAC sequences into the storage unit 101.

Subsequently, the long preamble generator 106 creates a preamble model with a length indicated by the preamble length identifying information based on the preamble setting information received from the long/short discriminator 105 as in the foregoing case where the preamble length is power of two and the square root of the preamble length divided by 2 is an integer.

Likewise, the long preamble generator 106 sequentially reads the individual created CAZAC sequences from the storage unit 101. Then, the long preamble generator 106 generates a long preamble corresponding to each CAZAC sequence by setting the elements in the read CAZAC sequence in order from C(1) to the elements in the created preamble model whose element deciding information is 1 in the order of the smaller-to-larger values of their position information.

The long preamble generator 106 sends the individual generated preambles to the PAPR calculator 108.

When the preamble length indicated by the preamble length identifying information received from the long/short discriminator 105 is not power of two, the long preamble generator 106 sets the length N of the long preamble to be generated to N=s1+d1+1+d2+s2, as shown in FIG. 4.

The length N is equivalent to the preamble length indicated by the preamble length identifying information, and s1 and s2 are equivalent to the lengths calculated from the position of the guard position identifying information received from the long/short discriminator 105. Then, the long preamble generator 106 calculates a minimum value L which satisfies (d1+d2)/2≤L, and creates a CAZAC sequence C(1) to C(L) with a length having the value L. It is assumed that $L^{1/2}$ is an integer.

In addition, the long preamble generator 106 creates L kinds of CAZAC sequences by cyclically shifting the individual elements in the created CAZAC sequence as in the foregoing case where the preamble length is power of two and the square mot of the preamble length divided by 2 is an integer. Then, the long preamble generator 106 stores the individual created CAZAC sequences into the storage unit 101.

Subsequently, the long preamble generator 106 creates a preamble model with a length indicated by the preamble length identifying information based on the preamble setting information received from the long/short discriminator 105 as in the foregoing case where the preamble length is power of two and the square root of the preamble length divided by 2 is an integer.

Likewise, the long preamble generator 106 sequentially reads the individual created CAZAC sequences from the storage unit 101. Then, the long preamble generator 106 generates a long preamble corresponding to each CAZAC sequence by setting the elements in the read CAZAC sequence in order from C(1) to the elements in the created preamble model whose element deciding information is 1 in the order of the smaller-to-larger values of their position information.

The long preamble generator 106 sends the long preamble generated in the above manner to the PAPR calculator 108.

Meanwhile, the short preamble generator 107 generates a short preamble as shown in FIG. 5 based on the Frank-Zadoff sequence stored in the storage unit 101 and the preamble setting information received from the long/short discriminator 105.

Specifically, the short preamble generator 107 determines whether the preamble length indicated by the preamble length identifying information received from the long/short discriminator 105 is power of two as in the process in the long preamble generator 106.

When the preamble length is power of two, the short preamble generator 107 determines whether the square mot of the preamble length, indicated by the received preamble length identifying information, divided by 4 is an integer. In the short preamble generator 107, the value of the preamble length divided by 4 is equivalent to the value L in the equation 1.

When the preamble length is power of two and the square mot of the preamble length divided by 4 is an integer, the short preamble generator 107 creates a CAZAC sequence having a length equal to the preamble length, indicated by the preamble length identifying information, divided by 4 based on the Frank-Zadoff sequence stored in the storage unit 101.

A case where the preamble length indicated by the received preamble length identifying information is 64 will be described. Since the preamble length is 64, the short preamble generator 107 determines that the preamble length is power of two.

Figure 11:
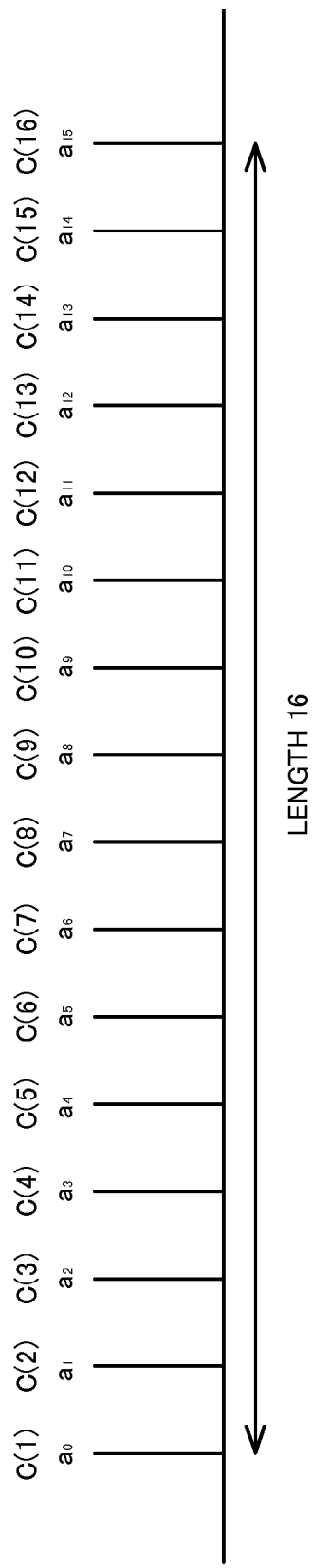
FIG. 11 is a diagram showing one example of a CAZAC sequence for a short preamble to be generated by the preamble generating apparatus according to the embodiment of the invention.

Since the preamble length divided by 4 is 16 whose square mot is an integer, the short preamble generator 107 substitutes k=0 to 15 in the equation 1 stored in the storage unit 101 to create a CAZAC sequence C(1) to C(16) with a length of 16 (a0, a1, a2, a3, a4, a5, a6, a7, a8, a9, a10, a11, a12, a13, a14, a15) as shown in FIG. 11.

Figure 12:
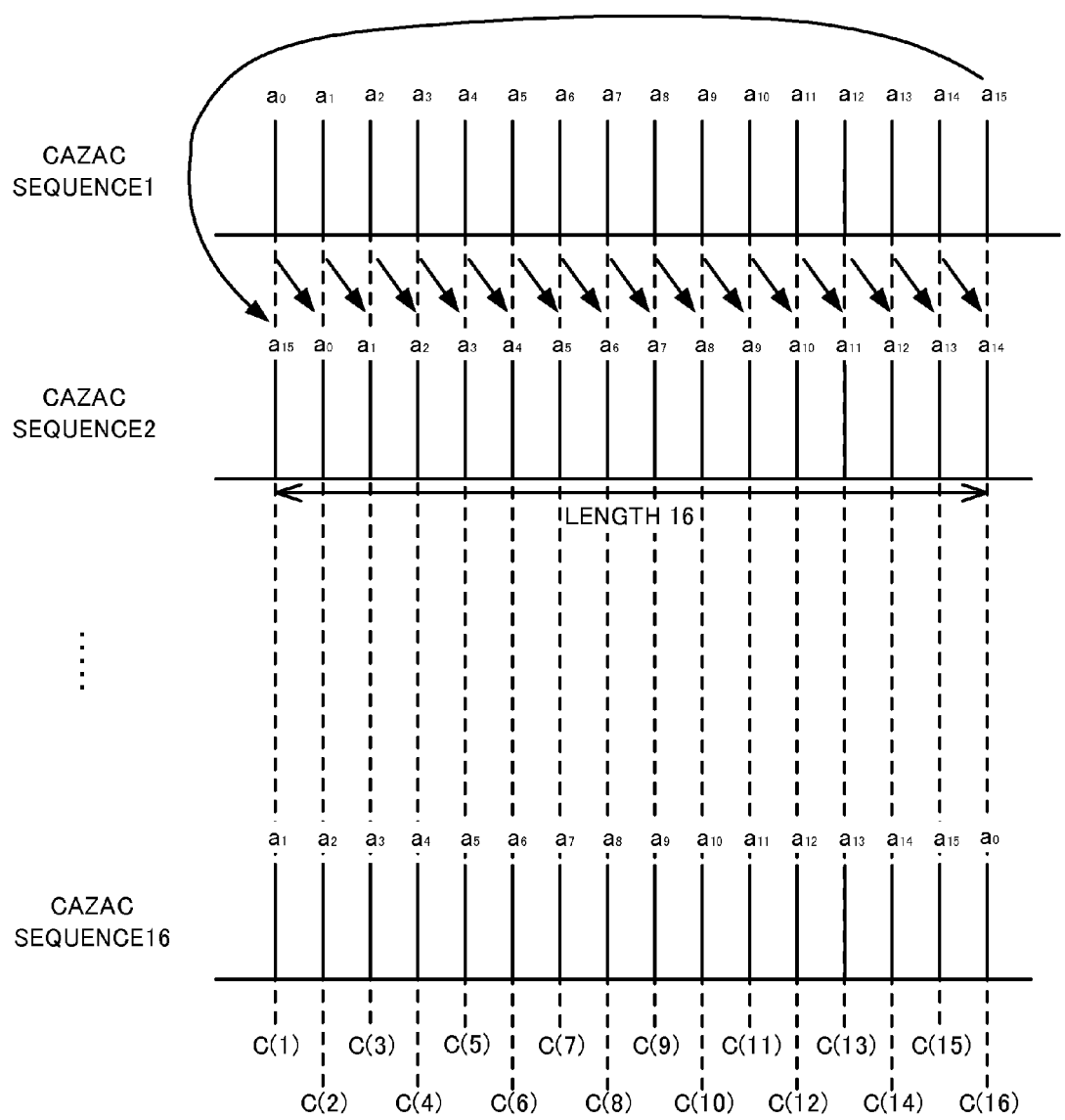
FIG. 12 is a diagram showing one example of a plurality of CAZAC sequences for a short preamble to be generated by the preamble generating apparatus according to the embodiment of the invention.

In addition, the short preamble generator 107 creates sixteen kinds of CAZAC sequences 1 to 16 by cyclically shifting the individual elements in the created CAZAC sequence with a length of 16, as in the process in the long preamble generator 106, as shown in FIG. 12. Then, the short preamble generator 107 stores the created CAZAC sequences into the storage unit 101.

Subsequently, the short preamble generator 107 creates a preamble model based on the preamble setting information received from the long/short discriminator 105.

The short preamble generator 107 stores the created preamble model into the storage unit 101.

The creation of a preamble model in the short preamble generator 107 will be described below. For ease of understanding, the description of the preamble model is given of the case where the element deciding information of the element used in data communication of the preamble is 1 and the element deciding information of the element not used in the data communication is 0, as in the case of the illustrated preamble model created by the long preamble generator 106.

First, the short preamble generator 107 creates a preamble model with a length indicated by the received preamble length identifying information. In this example, the element deciding information at the position corresponding to every position information is 1.

Then, the short preamble generator 107 sets the element deciding information at the positions indicated by the guard position identifying information and DC position identifying information received from the long/short discriminator 105 to 0. The short preamble generator 107 holds, to 1, only the element deciding information at the position corresponding to 4n+1 when the position information of an element with the lowest value in the remaining elements having element deciding information of 1 is assumed to be 1, and sets the element deciding information of the other elements to 0 where n≥0.

A description will be given of the case where the preamble length indicated by the received preamble length identifying information is 64 as in the foregoing example. The short preamble generator 107 creates a preamble model with a length of 64 as shown in FIG. 13A.

Figure 13B:
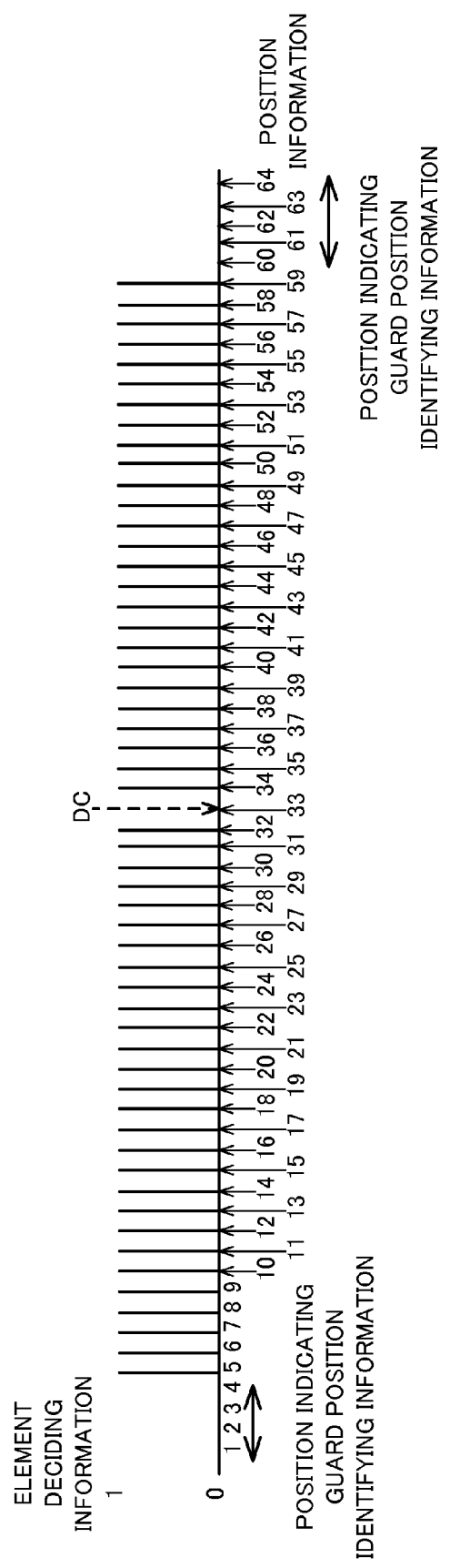
FIG. 13B is a diagram showing another example of a preamble model for a short preamble to be generated by the preamble generating apparatus according to the embodiment of the invention.

When the positions indicated by the guard position identifying information received from the long/short discriminator 105 are 1-4 and 60-64, and the position indicated by the DC position identifying information is 33, the short preamble generator 107 sets the element deciding information corresponding to those positions to 0 as shown in FIG. 13B.

Subsequently, since the position information of an element with the lowest value in the elements whose element deciding information is 1 is 5, the short preamble generator 107 assumes this position as 1. Then, the short preamble generator 107 holds, to 1, the element deciding information of elements at the positions expressed by 4n+1 when the positions whose position information is 5 are assumed to be 1, i.e., 5, 13, 17 and so forth, and sets the element deciding information of the other elements to 0 as shown in FIG. 13C.

The short preamble generator 107 creates a preamble model this way. The created preamble model is stored in the storage unit 101.

The short preamble generator 107 sequentially reads the individual created CAZAC sequences from the storage unit 101, and generates a short preamble corresponding to each CAZAC sequence by setting the elements in the CAZAC sequence in order from $C(1)$ to the elements in the created preamble model whose element deciding information is 1.

As in the foregoing description, a case where the preamble length indicated by the received preamble length identifying information is 64 will be described. The created preamble model is the preamble model shown in FIG. 13C, and the individual CAZAC sequences created are the CAZAC sequences shown in FIG. 12.

As shown in FIG. 14, the short preamble generator 107 generates preambles corresponding to the CAZAC sequences 1 to 16 by setting the elements in the CAZAC sequences 1 to 16 in FIG. 12 in order from $C(1)$ to the elements in the preamble model shown in FIG. 13C whose element deciding information is 1 in the order of the smaller-to-larger values of their position information.

The short preamble generator 107 sends the generated preambles to the PAPR calculator 108.

When the preamble length is power of two and the square mot of the preamble length divided by 4 is not an integer, the short preamble generator 107 creates two CAZAC sequences each having a length equal to half a value obtained by dividing the preamble length, indicated by the preamble length identifying information, by 4 based on the Frank-Zadoff sequence stored in the storage unit 101.

For example, a case where the preamble length indicated by the received preamble length identifying information is 32 will be described. Since the preamble length is 32, the short preamble generator 107 determines that the preamble length is power of two.

Since the preamble length divided by 4 is 8 whose square root is not an integer, the long preamble generator 106 substitutes k=0 to 3 in the equation 1 stored in the storage unit 101 to create two CAZAC sequences $C(1)$ to $C(4)$ with a length of 4 (a0, a1, a2, a3), and combines those CAZAC sequences as shown in FIG. 15. Therefore, the CAZAC sequence to be created becomes a CAZAC sequence $C(1)$ to $C(8)$ with a length of 32.

The short preamble generator 107 creates four kinds of CAZAC sequences by cyclically shifting the individual elements in the created CAZAC sequence as in the foregoing case where the preamble length is power of two and the square mot of the preamble length divided by 4 is an integer. Then, the short preamble generator 107 stores the individual created CAZAC sequences into the storage unit 101.

Subsequently, the short preamble generator 107 creates a preamble model with a length indicated by the preamble length identifying information based on the preamble setting information received from the long/short discriminator 105 as in the foregoing case where the preamble length is power of two and the square root of the preamble length divided by 4 is an integer.

As in the foregoing case where the preamble length is power of two and the square mot of the preamble length divided by 4 is an integer, the short preamble generator 107 sequentially reads the individual created CAZAC sequences from the storage unit 101. Then, the short preamble generator 107 generates a short preamble corresponding to each CAZAC sequence by setting the elements in the read CAZAC sequence in order from $C(1)$ to the elements in the created preamble model whose element deciding information is 1 in the order of the smaller-to-larger values of their position information.

The short preamble generator 107 sends the individual generated preambles to the PAPR calculator 108.

When the preamble length indicated by the preamble length identifying information received from the long/short discriminator 105 is not power of two, the short preamble generator 107 sets the length N of the short preamble to be generated to N=s1+d1+1+d2+s2, as shown in FIG. 5.

The length N is equivalent to the preamble length indicated by the preamble length identifying information, and s1 and s2 are equivalent to the lengths calculated from the position of the guard position identifying information received from the long/short discriminator 105. Then, the short preamble generator 107 calculates a minimum value L which satisfies (d1+d2)/4≤L, and creates a CAZAC sequence $C(1)$ to $C(L)$ with a length having the value L. It is assumed that $L^{1/2}$ is an integer.

The short preamble generator 107 creates L kinds of CAZAC sequences by cyclically shifting the individual elements in the created CAZAC sequence as in the foregoing case where the preamble length is power of two and the square mot of the preamble length divided by 4 is an integer. Then, the short preamble generator 107 stores the individual created CAZAC sequences into the storage unit 101.

Subsequently, the short preamble generator 107 creates a preamble model with a length indicated by the preamble length identifying information based on the preamble setting information received from the long/short discriminator 105 as in the foregoing case where the preamble length is power of two and the square root of the preamble length divided by 4 is an integer.

As in the foregoing case where the preamble length is power of two and the square mot of the preamble length divided by 4 is an integer, the short preamble generator 107 sequentially reads the individual created CAZAC sequences from the storage unit 101. Then, the short preamble generator 107 generates a short preamble corresponding to each CAZAC sequence by setting the elements in the read CAZAC sequence in order from C(1) to the elements in the created preamble model whose element deciding information is 1 in the order of the smaller-to-larger values of their position information.

The short preamble generator 107 sends the short preamble generated in the above manner to the PAPR calculator 108.

The PAPR calculator 108 calculates the value of each long preamble received from the long preamble generator 106, or the value of each short preamble received from the short preamble generator 107, or the values of each long preamble and each short preamble respectively received from both generators 106, 107.

The PAPR calculator 108 sends the calculated PAPR values in association with the respective preambles to the preamble deciding unit 109.

The preamble deciding unit 109 decides a long preamble corresponding to the lowest one of the PAPR values corresponding to the long preambles received from the PAPR calculator 108 as a long preamble to be used in data communication.

The preamble deciding unit 109 also decides a short preamble corresponding to the lowest one of the PAPR values corresponding to the short preambles received from the PAPR calculator 108 as a short preamble to be used in data communication.

The preamble deciding unit 109 sends the decided long preamble or short preamble, or both to the transmission unit 110.

As shown in FIG. 2, the transmission unit 110 adds the individual preambles received from the preamble deciding unit 109 to the transmission data received from the reception unit 104, and transmits the resultant transmission data to the IFFT unit 130.

The above has described the configuration of the preamble generating apparatus 100.

The input unit 120 includes a microphone to pick up audio signals, and various setting buttons such as numerical buttons and a mode selecting button. The input unit 120, when operated by the user, inputs transmission data used in data transmission, and preamble setting information indicating the settings such as the type of the preamble and the length of the preamble.

The IFFT unit 130 performs an IFFT process on the preamble-added transmission data received from the preamble generating apparatus 100 to transform the data to a time domain signal. The IFFT unit 130 sends the transformed time domain signal to the communication unit 150.

The communication unit 150 transmits the signal received from the IFFT unit 130 as a radio signal to a communication counterpart.

The above is the description of the configuration of the communication apparatus 10 equipped with the preamble generating apparatus 100.

Subsequently, the operation of the preamble generating apparatus 100 will be described with reference to FIG. 16.

The preamble generating process in the preamble generating apparatus 100 is initiated as the preamble generating program 103 stored in the storage unit 101 is executed every time the user inputs preamble setting information and transmission data to the input unit 120 and the preamble setting information and transmission data are sent to the preamble generating apparatus 100.

The preamble generating apparatus 100 receives the preamble setting information indicating the settings of a preamble input by the user using the functions of the reception unit 104, and sends the preamble setting information to the long/short discriminator 105. In addition, the preamble generating apparatus 100 receives the transmission data input by the user using the functions of the reception unit 104, and sends the transmission data to the transmission unit 110 (step S101).

The preamble generating apparatus 100 uses the functions of the long/short discriminator 105 to determine whether generation of a long preamble is requested based on preamble identifying information included in the received preamble setting information (step S102).

When it is determined that generation of a long preamble is requested (step S102; Yes), the preamble generating apparatus 100 sends the received preamble setting information to the long preamble generator 106 using the functions of the long/short discriminator 105 (step S103).

Subsequently, the preamble generating apparatus 100 uses the functions of the long preamble generator 106 to generate a plurality of CAZAC sequences and a preamble model based on the Frank-Zadoff sequence stored in the storage unit 101 and the received preamble setting information. Then, the preamble generating apparatus 100 generates a long preamble corresponding to each CAZAC sequence by setting the elements of each CAZAC sequence to the generated preamble model (step S104).

Using the functions of the long preamble generator 106, the preamble generating apparatus 100 sends the generated individual long preambles to the PAPR calculator 108 (step S105).

Next, the preamble generating apparatus 100 uses the functions of the long/short discriminator 105 to determine whether generation of a short preamble is also requested based on the preamble identifying information included in the received preamble setting information (step S106).

When the preamble generating apparatus 100 has determined in step S102 that generation of a long preamble is not requested (step S102; No), the preamble generating apparatus 100 determines whether or not generation of a short preamble is requested using the functions of the long/short discriminator 105 (step S107).

When it is determined in step S106 or step S107 that generation of a short preamble is requested (step S106; Yes) or (step S107; Yes), the preamble generating apparatus 100 sends the received preamble setting information to the short preamble generator 107 using the functions of the long/short discriminator 105 (step S108). When it is determined in step S107 that generation of a short preamble is not requested (step S107; No), this process is terminated.

Subsequently, using the functions of the short preamble generator 107, the preamble generating apparatus 100 generates a plurality of CAZAC sequences and a preamble model based on the Frank-Zadoff sequence stored in the storage unit 101 and the received preamble setting information. Then, the preamble generating apparatus 100 generates a short preamble corresponding to each CAZAC sequence by setting the elements of each CAZAC sequence to the generated preamble model (step S109).

Using the functions of the short preamble generator 107, the preamble generating apparatus 100 sends the generated individual short preambles to the PAPR calculator 108 (step S110).

When it is determined in step S106 that generation of a short preamble is not requested (step S106; No) or after executing the process of step S110, the preamble generating apparatus 100 uses the functions of the PAPR calculator 108 to calculate PAPRs corresponding to the received individual preambles from the long preamble generator 106 and the short preamble generator 107 (step S111).

Then, the preamble generating apparatus 100 sends the calculated PAPRs in association with the respective preambles to the preamble deciding unit 109 using the functions of the PAPR calculator 108 (step S112).

The preamble generating apparatus 100 uses the functions of the preamble deciding unit 109 to decide preambles corresponding to the lowest PAPR value for a long preamble and the lowest PAPR value for a short preamble among the PAPR values corresponding to the received preambles as preambles to be used in communication (step S113).

Using the functions of the transmission unit 110, the preamble generating apparatus 100 adds the decided preamble to the transmission data received from the input unit 120, and sends the resultant transmission data to the IFFT unit 130 (step S114). As a result, the preamble is transformed to a time domain signal, which is transmitted as a radio signal by the communication unit 150 of the communication apparatus 10.

The foregoing is the description of the preamble generating process in the preamble generating apparatus 100.

As described above, the preamble generating apparatus 100 according to the embodiment can process a CAZAC sequence according to the requested preamble length with a simple algorithm to thereby generate a preamble with an arbitrary length and a low PAPR.

Figure 17:
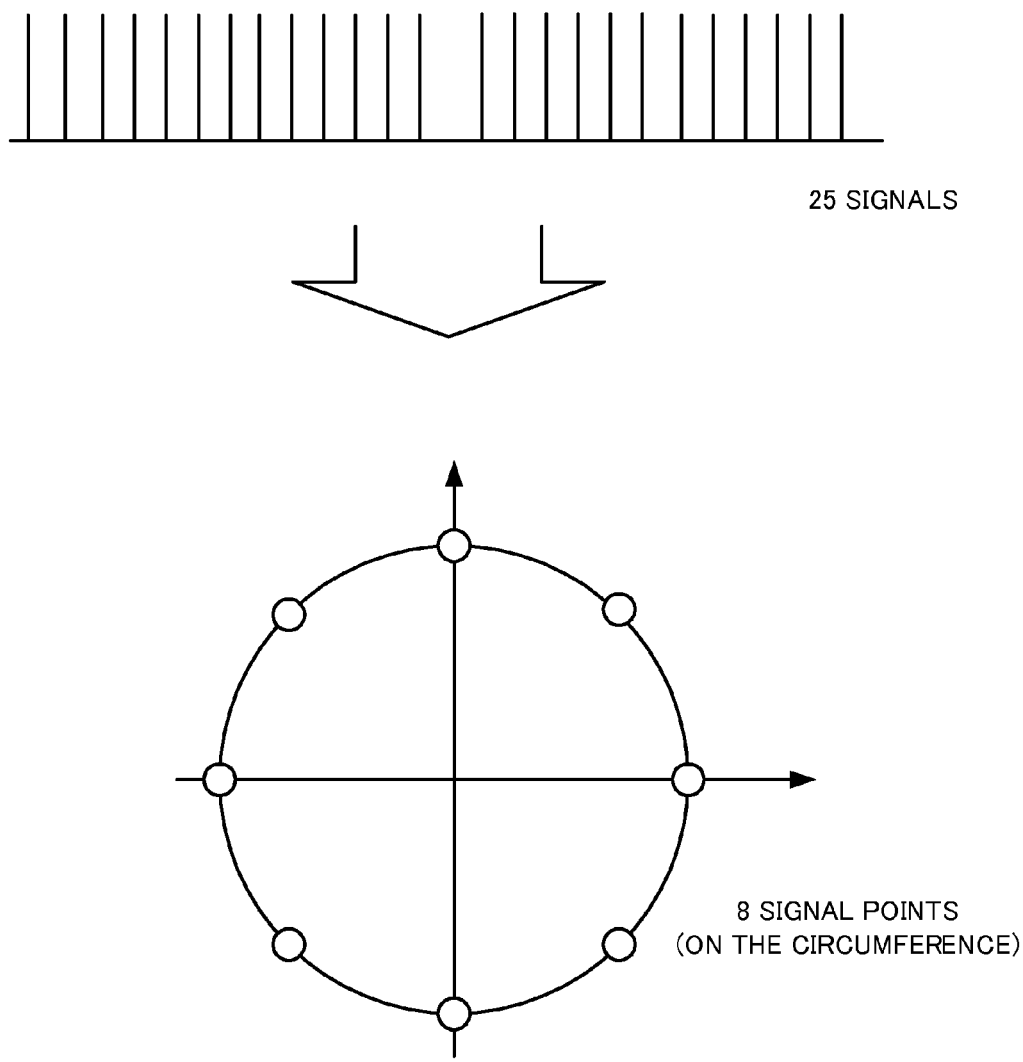
FIG. 17 is a diagram showing one example of the arrangement of signal points of preamble signals which are generated by the preamble generating apparatus according to the embodiment of the invention.

When the Frank-Zadoff sequence is used as a CAZAC sequence, the number of signal points of a modulation signal on the complex plain is fewer than the number of preamble signals and the signal points of the modulation signal are arranged on the complex plain and on the circumference, as shown in FIG. 17. This can reduce errors in detection of preamble signals.

Further, in the case of the conventional preamble generating method of generating a preamble by repeating a CAZAC sequence, the PAPR increases as the number of CAZAC sequences to be put consecutive increases like two, four and so forth, whereas the preamble generating apparatus 100 according to the embodiment can generate a preamble with a lower PAPR as compared with the conventional method.

(Modifications)

The invention is not limited to the foregoing embodiment, and may be modified and adapted in various ways. Although the preamble generating apparatus 100 is located inside the communication apparatus 10 and generates a preamble at the time of communication which is carried out thereafter in the foregoing example, the example is just illustrative.

The preamble generating apparatus 100 may be located outside the communication apparatus 10, and preambles generated by the preamble generating apparatus 100 may be stored in the ROM in the communication apparatus 10 beforehand and may be added to transmission data before transmission thereof. Since preambles are stored in the communication apparatus beforehand in this configuration, communication can be started in a shorter time.

According to the embodiment, the preamble setting information includes preamble identifying information identifying the type of a preamble requested to be generated. This is not restrictive, and the type of a preamble to be generated may be preset, or may be set automatically according to the communication system after acquiring information on the communication system.

The foregoing embodiment in which a preamble to be used in communication is generated in response to a user's request is one example. A plurality of different preambles may be generated, and an arbitrary preamble may be adequately selected according to the communication system and added to transmission data.

Further, a plurality of different preambles may be stored in the ROM in the communication apparatus 10, and an arbitrary preamble may be adequately selected according to the communication system and added to transmission data at the time of communication. Selection of a preamble may be performed according to the user's input operation, or may be performed according to the communication system after acquiring information on the communication system. This can allow an arbitrary preamble to be adequately selected according to various communication systems in carrying out communication.

According to the embodiment, a preamble model is created after creating a CAZAC sequence, and a preamble is generated by allocating the CAZAC sequence to the created preamble model, which is not restrictive. The order of creating a preamble model is optional, and may come before the creation of a CAZAC sequence.

The preamble generating apparatus 100 which achieves the preamble generating functions according to the embodiment of the invention is not limited to a dedicated system, and may be achieved by using an ordinary computer system. For example, the preamble generating apparatus 100 which executes the above-described process may be configured by installing the preamble generating program 103 for executing the above-described process onto a general-purpose computer from a medium (CD-ROM or the like) storing this program.

When the above-described functions are shared by the OS (Operating System) and an application, or are achieved by the cooperation of the OS and the application, for example, only the functions which are not covered by the OS may be stored in a medium.

The preamble generating program 103 may be superimposed on a carrier wave to be distributed over a communication network. For example, the program may be uploaded to a BBS (Bulletin Board System) on the communication network to be distributed there over. The program may be activated, and, like other application programs, may be executed to carry out the above-described process under control of the OS.

INDUSTRIAL APPLICABILITY

The invention is suitable for generation of a preamble.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A preamble generating apparatus used for synchronization of a reception apparatus in an orthogonal frequency division multiplexing system and generating a preamble to be added to a beginning of communication data at a time of communication, comprising:
   a reception unit that receives preamble setting information including preamble length identifying information indicating a length of the preamble requested to be generated, guard position identifying information indicating a position of an element constituting a guard interval in the preamble, and center position identifying information indicating an element in approximately a center of the preamble;
   a preamble-elements generating unit that generates a plurality of elements constituting the preamble according to a predetermined sequence based on the preamble length identifying information received by the reception unit, wherein the preamble-elements generating unit performs the following:
      if (1) the length of the preamble indicated by the preamble length identifying information is a power of two and (2) a square root of a value obtained by dividing the length of the preamble by two is an integer, creating elements comprising CAZAC sequences having a length equal to a value obtained by dividing the length of the preamble by two based on a Frank-Zadoff sequence;
      if (1) the length of the preamble indicated by the preamble length identifying information is a power of two and (2) a square root of the value obtained by dividing the length of the preamble by two is not an integer, creating two elements comprising CAZAC sequences each having a length equal to a half of the value obtained by dividing the length of the preamble by two based on the Frank-Zadoff sequence; or
      if the length of the preamble indicated by the preamble length identifying information is not a power of two, creating elements comprising a shortest CAZAC sequence that satisfies a length equal to or greater than a value obtained by (i) subtracting, from the length of the preamble, a length of the guard interval and a length of the element in approximately a center of the preamble, wherein the length of the element in approximately the center of the preamble is 1, and (ii) dividing the value obtained by (i) by two;
   a preamble-model creating unit that creates a preamble model including position information indicating a position of an element constituting the preamble and element deciding information indicating whether the element corresponding to the position is to be used in data communication, based on the preamble length identifying information, the guard position identifying information and the center position identifying information received by the reception unit;
   a preamble generating unit that generates a plurality of preambles by setting the elements generated by the preamble-elements generating unit at positions of the elements to be used in the data communication in the preamble model created by the preamble-model creating unit;
   a Peak-to-Average-Power Ratio (PAPR) calculator that calculates PAPRs respectively corresponding to the plurality of preambles generated by the preamble generating unit; and
   a preamble deciding unit that compares the PAPRs of the preambles calculated by the PAPR calculator with one another to decide that the preamble corresponding to a minimum PAPR is used in communication.

2. The preamble generating apparatus according to claim 1, wherein the preamble setting information further includes the preamble identifying information identifying a type of the preamble requested to be generated,
   the preamble-elements generating unit generates the plurality of elements constituting the preamble according to the predetermined sequence based on the preamble length identifying information and the preamble identifying information received by the reception unit, and
   the preamble-model creating unit creates the preamble model including the position information indicating the position of an element constituting the preamble and element deciding information indicating whether the element corresponding to the position is to be used in said data communication, based on the preamble length identifying information, the guard position identifying information, the center position identifying information and the preamble identifying information received by the reception unit.

3. The preamble generating apparatus according to claim 2, wherein the reception unit further receives communication data input by a user's input operation, and
   the preamble generating apparatus further comprises a transmission unit that adds the preamble decided by the preamble deciding unit to a beginning of the communication data received by the reception unit, and transmits the communication data to an IFFT unit which transforms a received signal to a time domain signal.

4. The preamble generating apparatus according to claim 3, further comprising a preamble storage unit that stores a preamble decided by the preamble deciding unit into a storage device of a communication equipment.

5. The preamble generating apparatus according to claim 2, further comprising a preamble storage unit that stores a preamble decided by the preamble deciding unit into a storage device of a communication equipment.

6. The preamble generating apparatus according to claim 1, wherein the reception unit further receives the communication data input by a user's input operation, and
   the preamble generating apparatus further comprises a transmission unit that adds a preamble decided by the preamble deciding unit to the beginning of the communication data received by the reception unit, and transmits the communication data to an Inverse Fast Fourier Transform (IFFT) unit which transforms a received signal to a time domain signal.

7. The preamble generating apparatus according to claim 6, further comprising a preamble storage unit that stores a preamble decided by the preamble deciding unit into a storage device of a communication equipment.

8. The preamble generating apparatus according to claim 1, further comprising a preamble storage unit that stores a preamble decided by the preamble deciding unit into a storage device of a communication equipment.

9. A preamble generating method used for synchronization of a reception apparatus in an orthogonal frequency division multiplexing system and generating a preamble to be added to a beginning of communication data at a time of communication, the method comprising:
   a reception step of receiving preamble setting information including preamble length identifying information indicating a length of the preamble requested to be generated, guard position identifying information indicating a position of an element constituting a guard interval in the preamble, and center position identifying information indicating an element in approximately a center of the preamble;

a preamble-elements generating step of generating a plurality of elements constituting the preamble according to a predetermined sequence based on the preamble length identifying information received at the reception step, wherein the preamble-elements generating step comprises:

if (1) the length of the preamble indicated by the preamble length identifying information is a power of two and (2) a square root of a value obtained by dividing the length of the preamble by two is an integer, creating elements comprising CAZAC sequences having a length equal to a value obtained by dividing the length of the preamble by two based on a Frank-Zadoff sequence;

if (1) the length of the preamble indicated by the preamble length identifying information is a power of two and (2) a square root of the value obtained by dividing the length of the preamble by two is not an integer, creating two elements comprising CAZAC sequences each having a length equal to a half of the value obtained by dividing the length of the preamble by two based on the Frank-Zadoff sequence; or if the length of the preamble indicated by the preamble length identifying information is not a power of two, creating elements comprising a shortest CAZAC sequence that satisfies a length equal to or greater than a value obtained by (i) subtracting, from the length of the preamble, a length of the guard interval and a length of the element in approximately the center of the preamble, wherein the length of the element in approximately the center of the preamble is 1, and (ii) dividing the value obtained by(i) by two;

a preamble-model creating step of creating a preamble model including position information indicating a position of an element constituting the preamble and element deciding information indicating whether the element corresponding to the position is to be used in data communication, based on the preamble length identifying information, the guard position identifying information and the center position identifying information received at the reception step;

a preamble generating step of generating a plurality of preambles by setting the elements generated at the preamble-elements generating step at positions of the elements to be used in the data communication in the preamble model created at the preamble-model creating step;

a Peak-to-Average-Power Ratio (PAPR) calculating step of calculating PAPRs respectively corresponding to the plurality of preambles generated at the preamble generating step; and a preamble deciding step of comparing the PAPRs of the preambles calculated at the PAPR calculating step with one another to decide that the preamble corresponding to a minimum PAPR is used in communication.

10. A non-transitory computer readable medium storing a program allowing a computer used for synchronization of a reception apparatus in an orthogonal frequency division multiplexing system and generating a preamble to be added to a beginning of communication data at a time of communication, to function as:

a reception unit that receives preamble setting information including preamble length identifying information indicating a length of the preamble requested to be generated, guard position identifying information indicating a position of an element constituting a guard interval in the preamble, and center position identifying information indicating an element in approximately a center of the preamble;

a preamble-elements generating unit that generates a plurality of elements constituting the preamble according to a predetermined sequence based on the preamble length identifying information received by the reception unit, wherein the preamble-elements generating unit performs the following:

if (1) the length of the preamble indicated by the preamble length identifying information is a power of two and (2) a square root of a value obtained by dividing the length of the preamble by two is an integer, creating elements comprising CAZAC sequences having a length equal to a value obtained by dividing the length of the preamble by two based on a Frank-Zadoff sequence;

if (1) the length of the preamble indicated by the preamble length identifying information is a power of two and (2) a square root of the value obtained by dividing the length of the preamble by two is not an integer, creating two elements comprising CAZAC sequences each having a length equal to a half of the value obtained by dividing the length of the preamble by two based on the Frank-Zadoff sequence; or if the length of the preamble indicated by the preamble length identifying information is not a power of two, creating elements comprising a shortest CAZAC sequence that satisfies a length equal to or greater than a value obtained by (i) subtracting, from the length of the preamble, a length of the guard interval and a length of the element in approximately a center of the preamble, wherein the length of the element in approximately the center of the preamble is 1, and (ii) dividing the value obtained by (ii) by two;

a preamble-model creating unit that creates a preamble model including position information indicating a position of an element constituting the preamble and element deciding information indicating whether the element corresponding to the position is to be used in data communication, based on the preamble length identifying information, the guard position identifying information and the center position identifying information received by the reception unit;

a preamble generating unit that generates a plurality of preambles by setting the elements generated by the preamble-elements generating unit at positions of the elements to be used in the data communication in the preamble model created by the preamble-model creating unit;

a Peak-to-Average-Power Ratio (PAPR) calculator that calculates PAPRs respectively corresponding to the plurality of preambles generated by the preamble generating unit; and a preamble deciding unit that compares the PAPRs of the preambles calculated by the PAPR calculator with one another to decide that the preamble corresponding to a minimum PAPR is used in communication.

* * * * *